(12) United States Patent  
Narendra et al.

(10) Patent No.: US 9,281,633 B2  
(45) Date of Patent: Mar. 8, 2016

(54) MICROUSB ACCESSORY DEVICE WITH ANTENNA

(71) Applicant: Tyfone, Inc., Portland, OR (US)

(72) Inventors: Siva G. Narendra, Portland, OR (US); Prabhakar Tadepalli, Bangalore (IN); Saurav Chakraborty, West Bengal (IN)

(73) Assignee: Tyfone, Inc., Portland, OR (US)

( * ) Notice: Subject to any disclaimer, the term of this patent is extended or adjusted under 35 U.S.C. 154(b) by 0 days.

(21) Appl. No.: 14/843,336

(22) Filed: Sep. 2, 2015

(65) Prior Publication Data

US 2015/0380874 A1 Dec. 31, 2015

Related U.S. Application Data

(62) Division of application No. 14/729,268, filed on Jun. 3, 2015, now Pat. No. 9,166,281, which is a division of application No. 13/629,595, filed on Sep. 27, 2012, now Pat. No. 9,077,794.

(51) Int. Cl.
*H01Q 1/24* (2006.01)
*H01R 13/66* (2006.01)

(52) U.S. Cl.
CPC .................... *H01R 13/665* (2013.01)

(58) Field of Classification Search
CPC ............................. H01Q 1/243; H04M 1/0274
USPC .................. 343/700 MS, 702, 872, 873, 906; 439/326, 636
See application file for complete search history.

(56) References Cited

U.S. PATENT DOCUMENTS

| | | | |
|---|---|---|---|
| 3,790,916 A | 2/1974 | Keitel | |
| 3,868,166 A | 2/1975 | Ammon | |
| 5,040,991 A | 8/1991 | Collier | |
| RE34,161 E | 1/1993 | Nakagawa et al. | |
| 5,259,795 A | 11/1993 | Yamada et al. | |
| 5,278,570 A * | 1/1994 | Jaramillo | H01Q 1/242 343/702 |
| 5,548,891 A | 8/1996 | Sakemi et al. | |
| 6,053,757 A | 4/2000 | Turnbull | |
| 6,211,833 B1 * | 4/2001 | Haupt | G01S 7/03 343/700 MS |
| 6,239,765 B1 * | 5/2001 | Johnson | H01Q 1/243 343/702 |
| 6,285,324 B1 * | 9/2001 | Korisch | H01Q 1/243 333/26 |
| 6,304,231 B1 * | 10/2001 | Reed | G01D 4/004 343/702 |
| 7,286,089 B2 | 10/2007 | Lee et al. | |
| 7,973,727 B2 | 7/2011 | An et al. | |
| 8,217,853 B2 | 7/2012 | Tai et al. | |
| 8,259,031 B2 | 9/2012 | Chen | |
| 8,922,448 B2 | 12/2014 | Wong et al. | |
| 9,166,284 B2 * | 10/2015 | Kamgaing | H01Q 1/38 |
| 2009/0079661 A1 | 3/2009 | Chang et al. | |

OTHER PUBLICATIONS

U.S. Appl. No. 14/729,268 Office Action dated Aug. 31, 2015, 5 pages.

* cited by examiner

*Primary Examiner* — Tho G Phan
(74) *Attorney, Agent, or Firm* — Dana B. LeMoine

(57) ABSTRACT

A Lightning connector compatible accessory device includes circuitry that is completely enveloped by a mobile device when the accessory device is inserted in a Lightning connector. The accessory device may include a microUSB connector on one end of a printed circuit board. The printed circuit board may be offset in a housing.

11 Claims, 12 Drawing Sheets

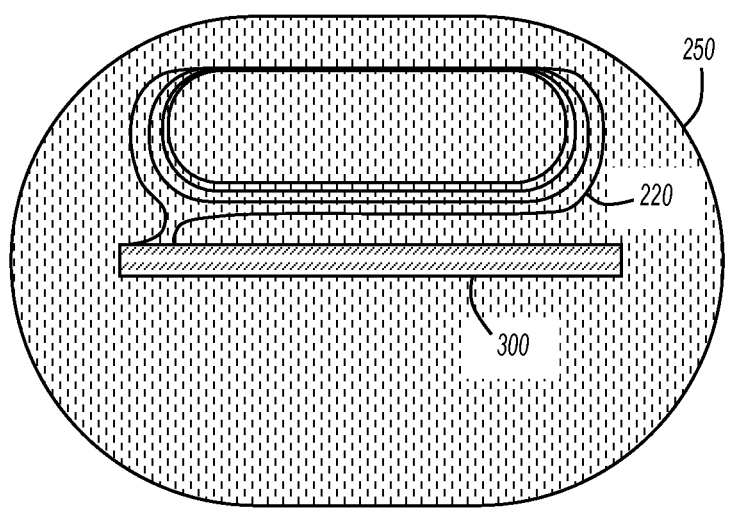
FIG. 4    SECTION A'-A' (FIG. 2)
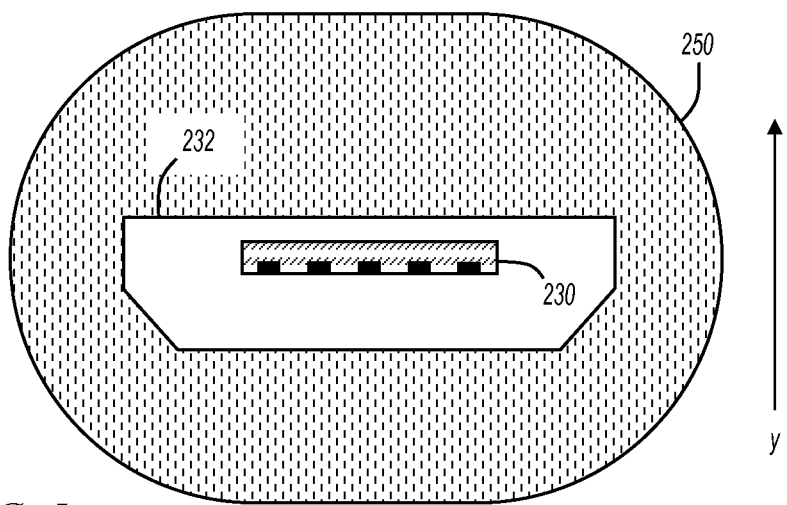
FIG. 5    SECTION A-A (FIG. 2)

SECTION B-B (FIG. 6)

MICROUSB ACCESSORY DEVICE WITH ANTENNA

FIELD

The present invention relates generally to mobile device accessory devices, and more specifically to accessory devices compatible with the Apple Lightning connector.

BACKGROUND

The Apple Lightning connector is new. Apple is a registered trademark of Apple, Inc. of Cupertino, Calif. Apple Lightning is a pending trademark of Apple Inc. of Cupertino, Calif. (US Trademark application 85726560). The Apple Lightning connector has a smaller external footprint than the legacy 30-pin connector, but a portion of the connector that does not have pins extends deeper into the device.

BRIEF DESCRIPTION OF THE DRAWINGS

FIGS. 4 and 5 show sectional views of the Apple Lightning accessory device shown in FIG. 2;

DESCRIPTION OF EMBODIMENTS

Figure 1:
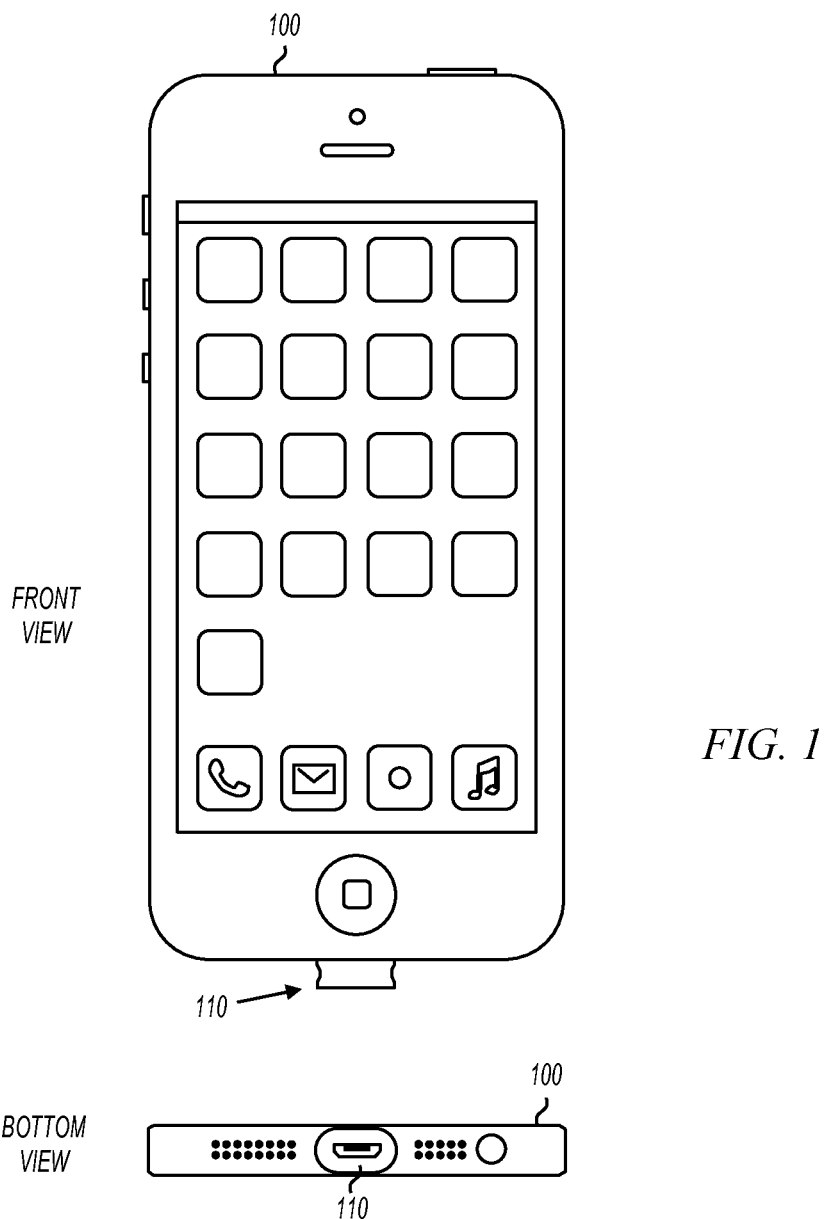
FIG. 1 shows a mobile device with an Apple Lightning accessory device.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a mobile device with an Apple Lightning accessory device. FIG. 1 shows an Apple iPhone 5 at 100. Apple and iPhone are registered trademarks of Apple Inc. of Cupertino, Calif. Coupled to the iPhone's Lightning connector is an Apple Lightning accessory device 110. In some embodiments, device 110 includes a micro universal serial bus (microUSB) connector. In still further embodiments, device 110 includes contactless capability. For example, device 110 may include smartcard circuitry, near field communications (NFC) circuitry, or the like.

Accessory device 110 is not limited to use with an iPhone 5. Accessory device 110 may be used with any device that includes an Apple Lightning connector. Further, the microUSB connector can be any other type of connector without departing from the scope of the present invention.

FIG. 1 shows a front view and a bottom view. When accessory device 110 is inserted into an Apple Lightning connector, an insertable portion (not shown) of the accessory device is completely enveloped within the mobile device (iPhone 5 in this example), and another portion (visible in FIG. 1) is external to the mobile device. The external portion of the accessory device is referred to herein as the "housing." In some embodiments, the housing includes a microUSB connector as shown in FIG. 1. Further, in some embodiments, the housing includes an antenna. The antenna may be formed with traces on a printed circuit board within the housing, or may be suspended within the housing, or may be on the outside of the housing. Various housing and antenna embodiments are described further below.

In some embodiments, accessory device 110 includes a physical sticker, transparent or otherwise, that adds additional mechanical glue taping the accessory device to the mobile device so the accessory device cannot be pulled out easily by accident or on purpose. In some embodiments this tape contains an antenna for a contactless radio or could house additional circuit components including but not limited to the antenna needed for the contactless radio.

In some embodiments, an application can be run on the mobile device in the background to periodically check for the presence of the accessory device, and if absent, warn the user or send an alert to a central system to take appropriate action to prevent any processing or authentication that might originate from the removed accessory device. This function could be performed by the OS instead of a background application.

Figure 2:
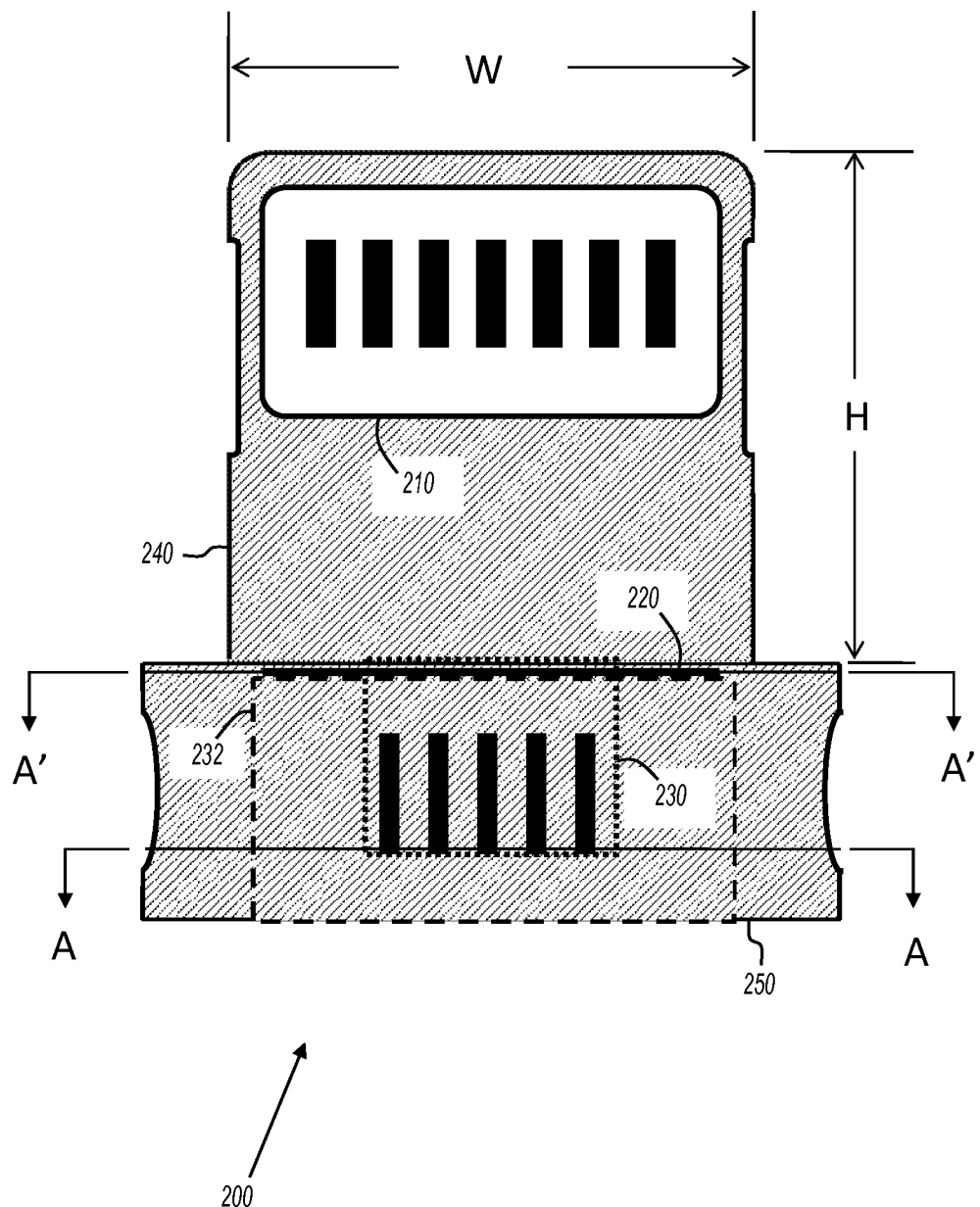
FIG. 2 shows a partial cutaway view of an Apple Lightning accessory device.

FIG. 2 shows a partial cutaway view of an Apple Lightning accessory device. Accessory device 200 includes insertable portion 240 and housing 250. Housing 250 corresponds to the visible portion of accessory device 110 in FIG. 1. Insertable portion 240 is the portion of accessory device 200 that is completely enveloped by a mobile device when the accessory device is inserted in a Lightning connector. Insertable portion 240 has dimensions, W and H, which are defined by Apple. Dimensions W and H as well as all dimensions in the description have natural tolerances within the specification and in addition the specification themselves may be revised.

Insertable portion 240 includes Apple Lightning compatible contacts 210. The size, location, and function of contacts 210 are defined by Apple. In some embodiments, Apple Lightning compatible contacts 210 are on both faces of insertable portion 240. In some embodiments, active and passive circuits are included on the insertable portion 240 in areas not occupied by Lightning compatible contacts 210. For example, one or more bare integrated circuit die may be mechanically and electrically coupled to a printed circuit board in this area. Also for example, packaged integrated circuits and discrete component such as capacitors, inductors, resistors, crystals, diodes, light emitting diodes, and the like may be affixed to the printed circuit board in this area.

Housing 250 is shown with a partial cutaway to expose a microUSB connector. The microUSB connector includes contacts 230 within a cavity 232. In some embodiments, microUSB contacts 230 are formed on one end of a circuit board that has Lightning compatible contacts affixed on the other end.

Apple Lightning connector accessory device 200 also includes antenna 220. In some embodiments, antenna 220 is formed within housing 250, and in other embodiments, antenna 220 is attached to an external face of housing 250. In some embodiments, antenna 220 may be a single antenna or a combination of multiple antennas. As shown in FIG. 2, antenna 220 is oriented perpendicular to the printed circuit board upon which the microUSB contacts 230 are formed. This results in the antenna being perpendicular to the mating direction of the microUSB connector. When accessory device 200 is inserted in a mobile device (e.g. iPhone 5 as shown in FIG. 1), and antenna 220 is to be coupled to another antenna, the user will present the long dimension of the mobile device perpendicular to the reading device. This will ensure maximum field coupling to antenna 220. A cross section of accessory device 200 showing antenna 220 is described below with reference to FIG. 4.

Figure 3:
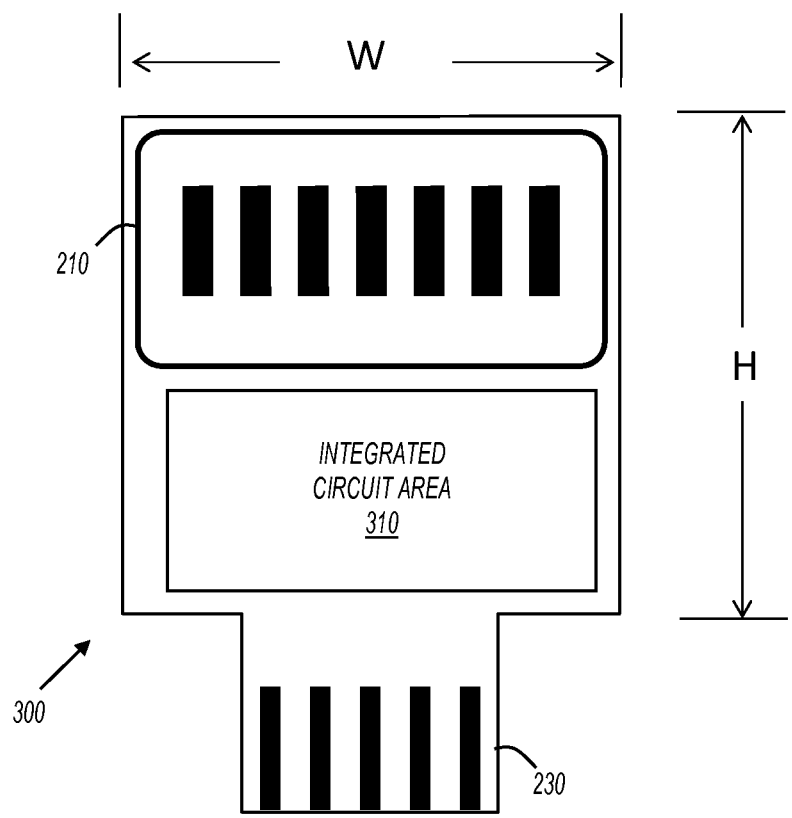
FIG. 3 shows a printed circuit board for use in an Apple Lightning accessory device.

FIG. 3 shows a printed circuit board for use in an Apple Lightning accessory device. Printed circuit board 300 is suitable for use in the accessory device of FIG. 2. Printed circuit board 300 includes microUSB contacts 230 on a first end, and Apple Lightning compatible contacts 210 on a second end. In some embodiments, Apple Lightning compatible contacts 210 are components that are affixed to printed circuit board 300, and in some embodiments, Apple Lightning compatible contacts having different thicknesses are affixed to opposing sides of printed circuit board 300. Printed circuit board 300 also includes integrated circuit area 310. In some embodiments, circuit components such as bare integrated circuit die, packaged integrated circuits, and discrete components are mechanically and electrically coupled to printed circuit board 300 in integrated circuit area 310. In some embodiments, the printed circuit board is offset within the accessory device such that one side of the printed circuit board will accept taller components than the opposing side. For example, if Apple Lightning compatible contacts with different thicknesses are affixed to opposing sides of printed circuit board 300, the side with the thicker contacts will be able to accept taller components.

FIGS. 4 and 5 show sectional views of the Apple Lightning accessory device shown in FIG. 2. FIG. 4 shows a section of housing 250 that includes antenna 220. In some embodiments, antenna 220 is on an external face of housing 250 where housing 250 comes in to contact with the mobile device. In these embodiments, antenna 220 may be covered with magnetic shielding material. In other embodiments, antenna 220 may be suspended within housing 250. For example, housing 250 may be formed of molded plastic, and antenna 220 may be located within housing 250 during the molding process. FIG. 4 also shows printed circuit board 300. In some embodiments, printed circuit board 300 has traces that electrically couple antenna 220 to other circuitry electrically coupled to circuit board 300.

Although antenna 220 is shown above circuit board 300, this is not a limitation of the present invention. For example, in some embodiments, antenna 220 is situated below circuit board 300. In still further embodiments, antenna 220 is wound around circuit board 300 to achieve a larger coupling area within the loops. Also in some embodiments, multiple antennas are included within housing 250. For example, one antenna may be above printed circuit board 300, and one antenna may be below printed circuit board 300. In some embodiments, one or more of the antennas may be a three dimensional coil wound around a core such as an air core or any structural core such as, but not limited to, magnetic or ceramic material.

FIG. 5 shows a section of housing 250 that includes microUSB contacts 230 and cavity 232. In some embodiments, microUSB contacts 230 are formed directly on a printed circuit board such as printed circuit board 300 (FIG. 3). In some embodiments, the printed circuit board upon which microUSB contacts 230 are formed is centered within housing 250 in the y dimension as shown in FIG. 5. In these embodiments, cavity 232 is not centered in the y dimension. In other embodiments, the printed circuit board is offset in the y dimension. In these embodiments, cavity 232 may or may not be centered within housing 250 in the y dimension. For example, in some embodiments, the offset of the printed circuit board is equal to the offset of the contacts within a microUSB connector. In these embodiments, cavity 232 will be centered in housing 250.

Figure 6:
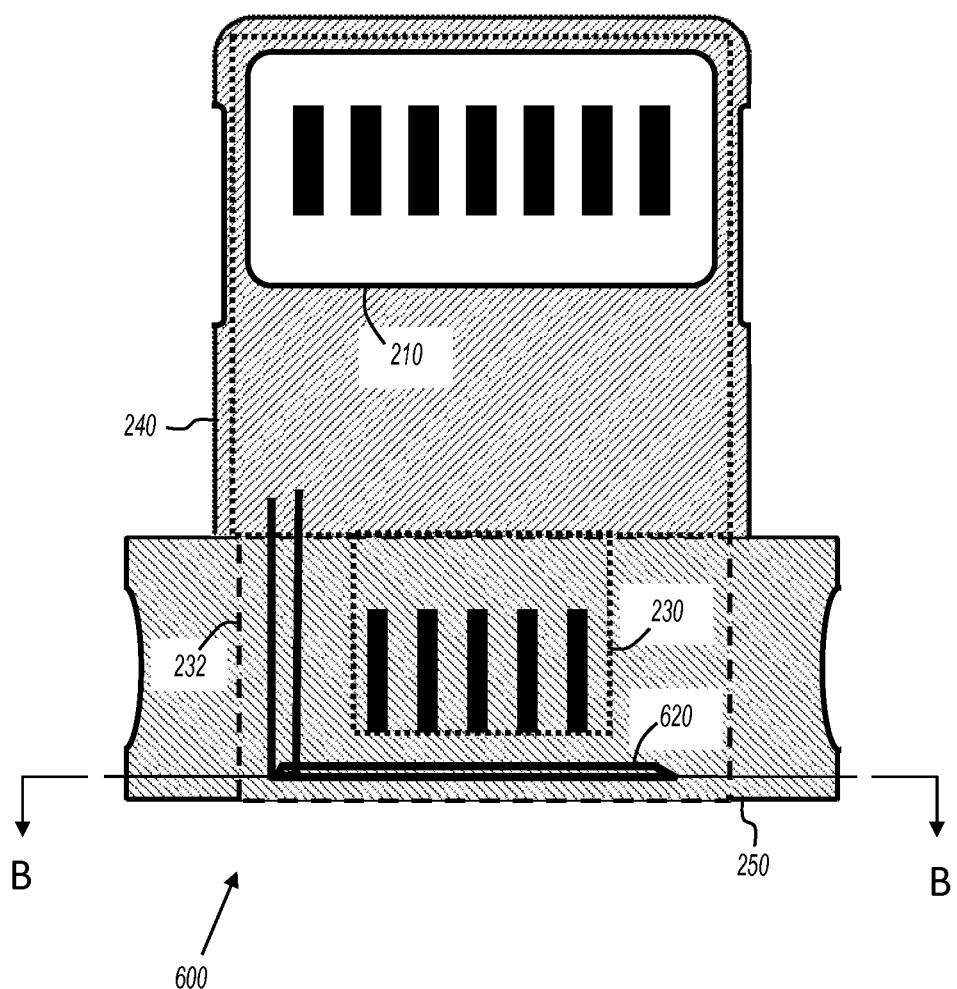
FIG. 6 shows a partial cutaway view of an Apple Lightning accessory device.

FIG. 6 shows a partial cutaway view of an Apple Lightning accessory device. Apple Lightning accessory device 600 includes insertable portion 240, housing 250 with cavity 232, microUSB contacts 230, and Apple Lightning compatible contacts 210. Housing 250 also includes antenna 620. Antenna 620 is located differently within housing 250 as compared to antenna 220 (FIG. 2). The location of antenna 620 within housing 250 is described further below with reference to FIG. 7.

Figure 7:
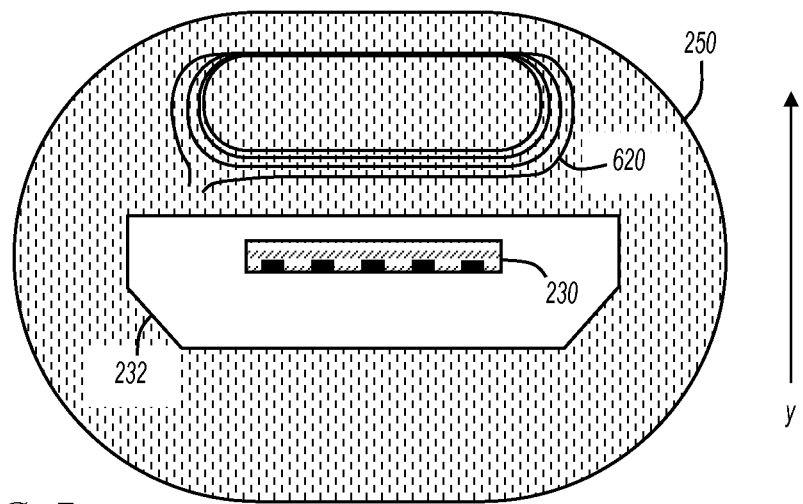
FIG. 7 shows a sectional view of the Apple Lightning accessory device shown in FIG. 6.

FIG. 7 shows a sectional view of the Apple Lightning accessory device shown in FIG. 6. FIG. 7 shows a section of housing 250 that includes microUSB contacts 230, cavity 232, and antenna 620. In some embodiments, microUSB contacts 230 are formed directly on a printed circuit board such as printed circuit board 300 (FIG. 3). In some embodiments, the printed circuit board upon which microUSB contacts 230 are formed is centered within housing 250 in the y dimension as shown in FIG. 7. In these embodiments, cavity 232 is not centered in the y dimension. In other embodiments, the printed circuit board is offset in the y dimension. In these embodiments, cavity 232 may or may not be centered within housing 250 in the y dimension. For example, in some embodiments, the offset of the printed circuit board is equal to the offset of the contacts within a microUSB connector. In these embodiments, cavity 232 will be centered in housing 250.

As shown in FIGS. 6 and 7, antenna 620 is suspended within housing 250. For example, housing 250 may be formed of molded plastic, and antenna 620 may be located within housing 250 during the molding process. Although antenna 620 is shown above cavity 232, this is not a limitation of the present invention. For example, in some embodiments, antenna 620 is situated below cavity 232. In still further embodiments, antenna 620 is wound around cavity 232 to achieve a larger coupling area within the loops. Also in some embodiments, multiple antennas are included within housing 250. For example, one antenna may be above cavity 232, and one antenna may be below cavity 232.

As shown in FIG. 6, antenna 620 is oriented perpendicular to the mating direction of the microUSB connector. Antenna 620 is also oriented perpendicular to the printed circuit board upon which the microUSB contacts 230 are formed.

Figure 8:
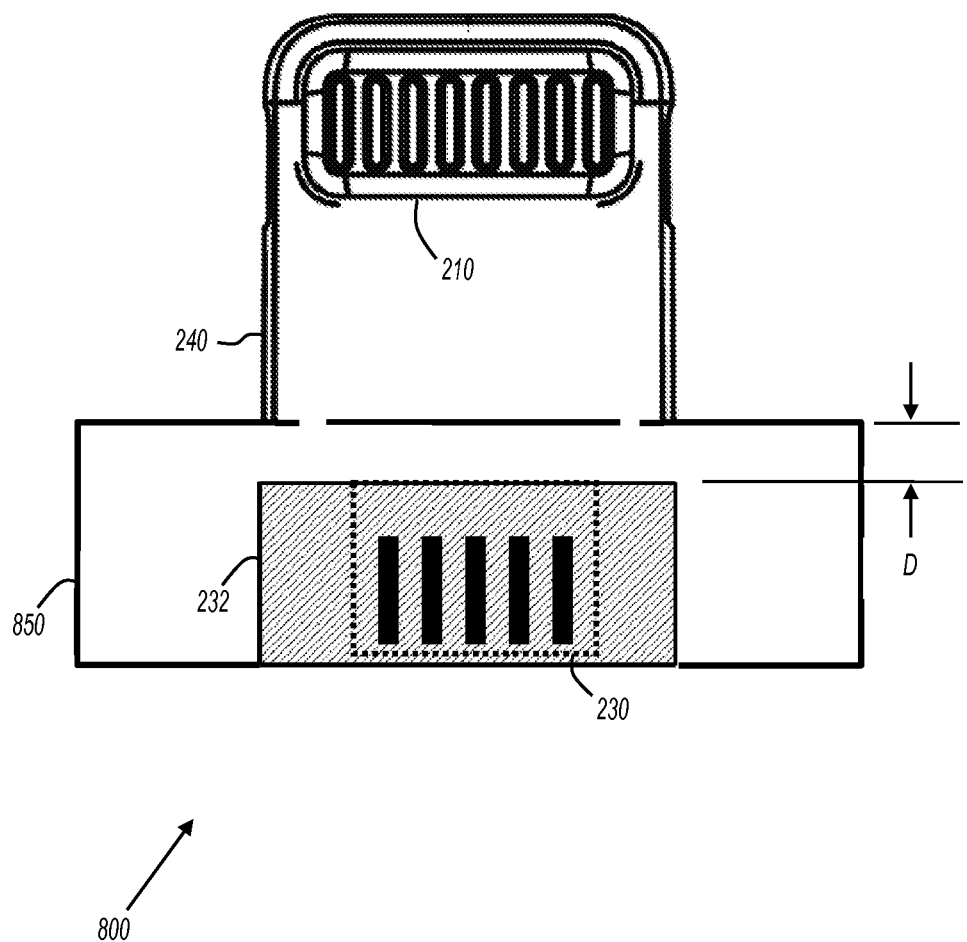
FIG. 8 shows a partial cutaway view of an Apple Lightning accessory device.

FIG. 8 shows a partial cutaway view of an Apple Lightning accessory device. Apple Lightning accessory device 800 includes insertable portion 240, housing 850, and Apple Lightning compatible contacts 210. FIG. 8 also shows a cutaway portion of accessory device 800 revealing microUSB contacts 230 and cavity 232. Housing 850 protrudes further outside the mobile device by an amount shown as D in FIG. 8. In some embodiments, the extra depth allows for more of the printed circuit board to reside outside the mobile device when accessory device 800 is inserted in a Lightning connector.

Figure 9:
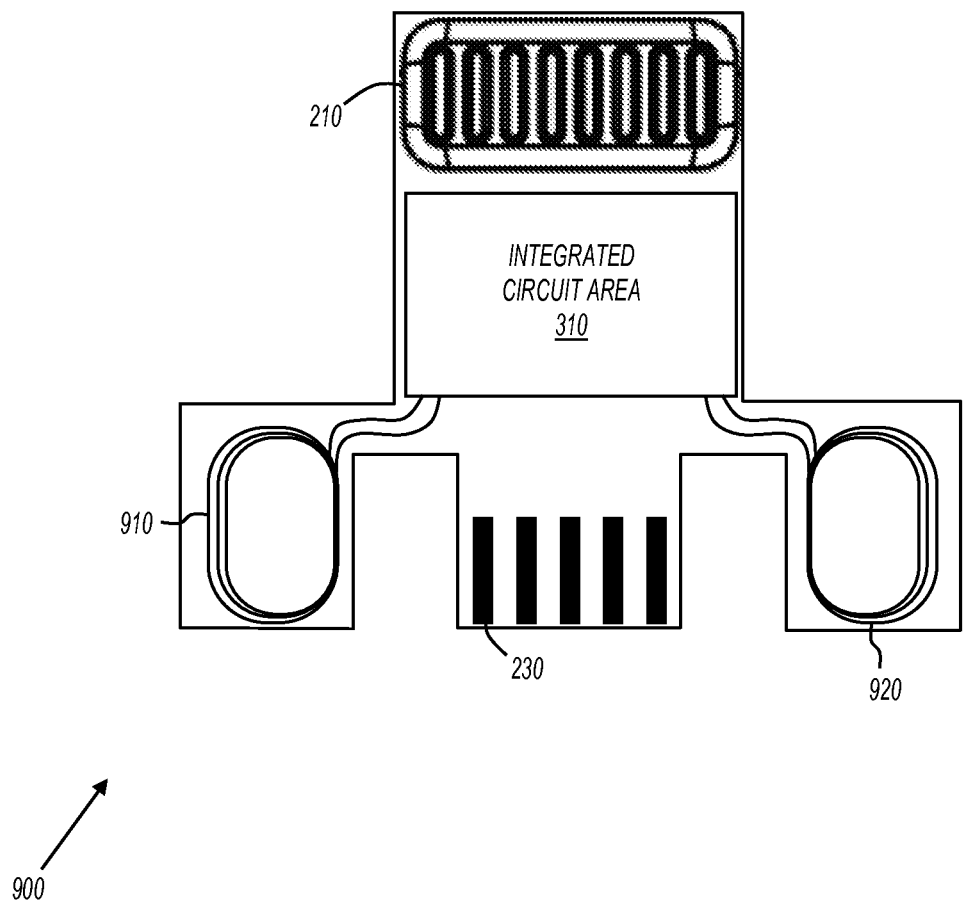
FIG. 9 shows a printed circuit board for use in an Apple Lightning accessory device.

FIG. 9 shows a printed circuit board for use in an Apple Lightning accessory device. Printed circuit board 900 is suitable for use in the accessory device of FIG. 8. Printed circuit board 900 includes microUSB contacts 230 on a first end, and Apple Lightning compatible contacts on a second end. Printed circuit board 900 also includes integrated circuit area 310. In some embodiments, circuit components such as bare integrated circuit die, packaged integrated circuits, and discrete components are mechanically and electrically coupled to printed circuit board 900 in integrated circuit area 310.

Printed circuit board 900 also includes antennas 910 and 920. Antennas 910 and 920 are formed with traces on printed circuit board 900 and are electrically coupled to circuitry in integrated circuit area 310. As shown in FIG. 9, antennas 910 and 920 are oriented parallel to printed circuit board 900 and perpendicular to the mating direction of the microUSB connector. When an accessory device that includes printed circuit board 900 is inserted in a mobile device (e.g. iPhone 5 as shown in FIG. 1), and antennas 910 and 920 are to be coupled to another antenna, the user will present the long dimensions of the mobile device parallel to the reading device with the housing in the vicinity of the other antenna. This will ensure maximum field coupling to antennas 910 and 920.

Figure 10:
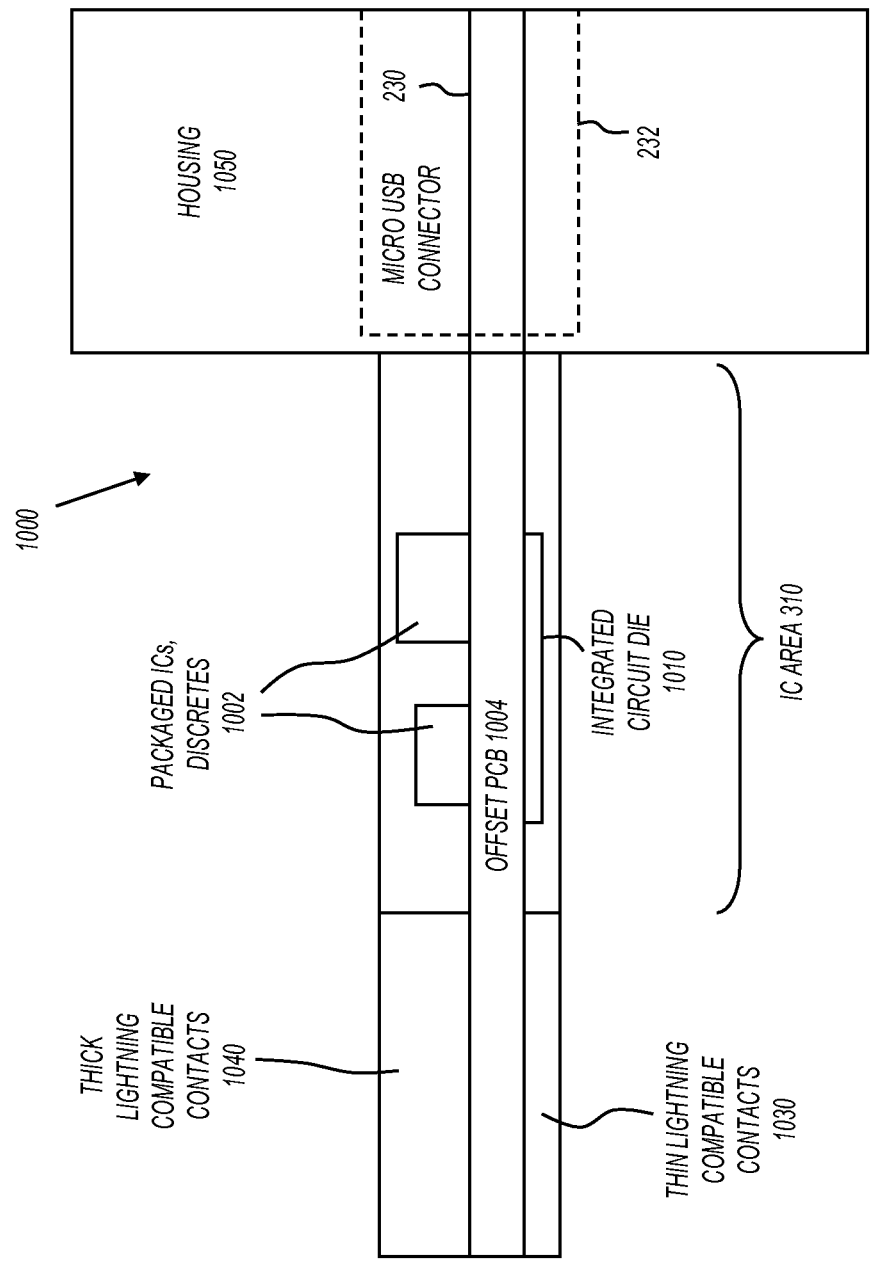
FIG. 10 shows a cross-section of an Apple Lightning accessory device with an offset printed circuit board.

FIG. 10 shows a cross-section of an Apple Lightning accessory device with an offset printed circuit board. Accessory device 1000 may be any of the accessory devices described herein, and offset printed circuit board 1004 may be any of the printed circuit boards described herein. For example, accessory device 1000 may be accessory device 200 (FIG. 2), accessory device 600 (FIG. 6), or accessory device 800 (FIG. 8). Also for example, offset printed circuit board 1004 may be printed circuit board 300 (FIG. 3), printed circuit board 900 (FIG. 9), or any other circuit board suitable for use in an Apple Lightning accessory device.

Accessory device 1000 includes Apple Lightning compatible contacts of different thicknesses affixed to opposing sides of printed circuit board 1004 to cause the printed circuit board to be offset when the accessory device is inserted in an Apple Lightning connector. For example, printed circuit board 1004 may be 0.45 mm thick and may be offset by about 0.22 mm. Apple Lightning compatible contacts 1030 may be about 0.3 mm thick and Apple Lightning compatible contacts 1040 may be about 0.7 mm thick for an overall thickness of about 1.5 mm.

Offsetting printed circuit board 1004 provides more usable height on one side of the printed circuit board than on the other. This may be used advantageously to mount taller components on the side with more height. For example, packaged integrated circuits and discrete components 1002 may require more height than bare integrated circuit die 1010.

Housing 1050 may be any suitable housing. For example, in some embodiments, housing 1050 may be a housing with an antenna attached or suspended (housing 250), or may be a housing with a printed circuit board having an antenna formed with traces (housing 850).

Although offset printed circuit board 1004 is described in the context of an accessory device with a microUSB connector (and other components such as an antenna), this is not a limitation of the present invention. For example, various embodiments of the present invention include an offset printed circuit board with Lightning compatible contacts affixed to opposing sides without a microUSB connector, and without an antenna.

Figure 11:
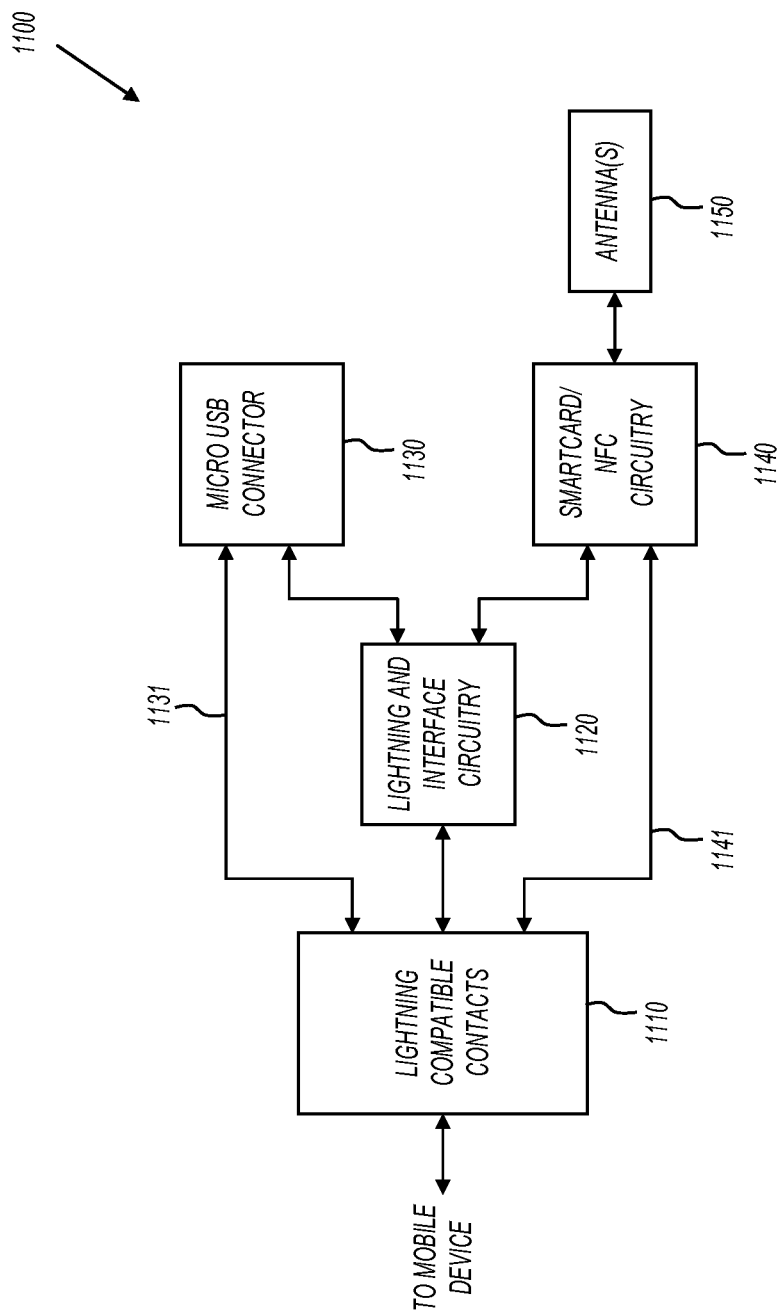
FIGS. 11 and 12 show block diagrams of Apple Lightning accessory devices in accordance with various embodiments of the present invention.
Figure 12:
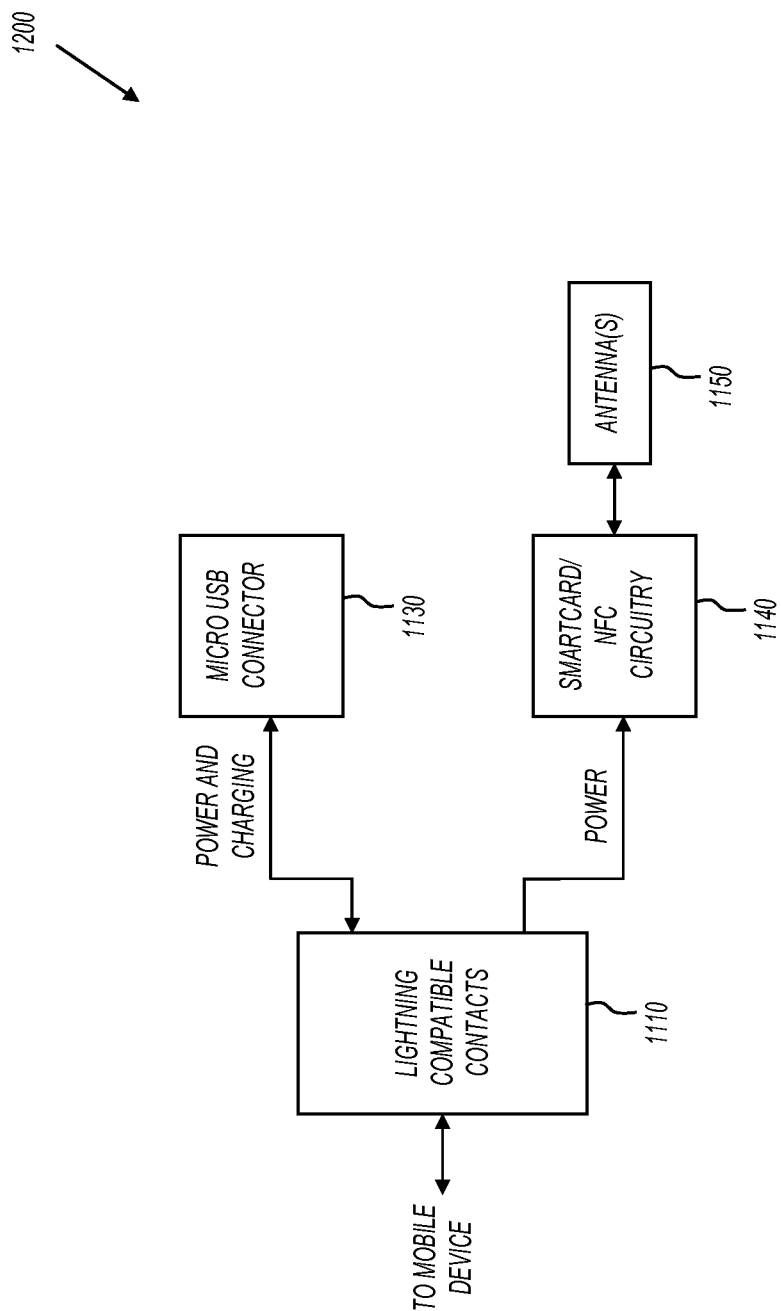

FIGS. 11 and 12 show block diagrams of Apple Lightning accessory devices in accordance with various embodiments of the present invention. FIG. 11 shows Apple Lightning accessory device 1100 including Lightning compatible contacts 1110, Lightning and interface circuitry 1120, microUSB connector 1130, smartcard/NFC circuitry 1140, and antenna(s) 1150.

Lightning compatible contacts 1110 are electrical contacts that are compatible with the Apple Lightning connector. Examples of Lightning compatible contacts are shown throughout the figures. In some embodiments, Lightning compatible contacts 1110 include two devices of different thicknesses that affix to opposing sides of a printed circuit board to cause the printed circuit board to be offset as described above with reference to FIG. 10. Lightning compatible contacts 1110 include contacts that provide power and also includes contacts that communicate data. In embodiments represented by FIG. 11, microUSB connector 1130 and smartcard/NFC circuitry 1140 are coupled to Lightning compatible contacts that provide both power and data.

Lightning and interface circuits 1120 provide the Apple Lightning protocol that allows accessory devices to be accessed by software running on the mobile device with the Lightning connector. Lightning and interface circuits 1120 also provide the handshaking used to determine the functionality of the various contacts in the Lightning connector.

MicroUSB connector 1130 may be any of the microUSB connectors described herein. For example, microUSB connector 1130 may include contacts formed on one end of a printed circuit board. Further, microUSB connector 1130 may include a cavity in a housing external to the mobile device. In some embodiments, microUSB connector 1130 is coupled to mobile device power via interconnect 1131. In these embodiments, microUSB connector 1130 may effect charging of the mobile device when accessory device 1100 is inserted in a Lightning connector.

In some embodiments, smartcard/NFC circuitry 1140 is a dual interface smartcard controller with one of the interfaces including RFID functionality. In some embodiments, smartcard/NFC circuitry 1140 is compatible with passive RFID tag readers in NFC applications. For example, smartcard/NFC circuitry 1140 may be a device capable of implementing all or part of the ISO 14443 standard for contactless NFC devices. Also for example, smartcard/NFC circuitry 1140 may be a dual interface smartcard controller capable of implementing both ISO 7816 and ISO 14443 standards for contact/contactless requirements. The "SmartMX" family of controllers available from NXP of The Netherlands are examples of suitable dual interface smartcard controllers. These controllers provide RFID functionality at 13.56 MHz. The various embodiments of the present invention operate at 13.56 MHz, but are not limited to operation at this frequency. In some embodiments, smartcard/NFC circuitry 1140 interoperates with MIFARE systems for ticketing applications.

Smartcard/NFC circuitry 1140 also receives power from the mobile device through Lightning compatible contacts 1110 and interconnect 1141. Antenna(s) 1150 is too small to draw power from an interrogating RF field, but this is not necessary since smartcard/NFC circuitry 1140 is powered by the mobile device through Lightning compatible contacts 1110. By not receiving power from antenna(s) 1150 through an interrogating RF field, the necessity of a large loop antenna for power generation is negated.

Lightning and interface circuits 1120 and smartcard/NFC circuits 1140 are examples of integrated circuits that may be mechanically and electrically coupled to a portion of a printed circuit board that is completely enveloped by a mobile device when the accessory device is inserted in a Lightning connector. For example, smartcard/NFC circuitry 1140 may be one or more bare silicon die that can be mounted as shown at 1010 in FIG. 10. Also for example, Lightning and interface circuitry 1120 may include packaged integrated circuits and discrete components that can be mounted as shown at 1002 in FIG. 10.

Antenna(s) 1150 may be any antenna embodiment described herein. For example, antenna(s) 1150 may be perpendicular or parallel to a printed circuit board. Antenna(s) 1150 may also be perpendicular or parallel to a mating direction of the microUSB connector. Still further, Antenna(s) may be formed with traces on a printed circuit board, or may be suspended in a housing or attached to an external surface of a housing.

Accessory device 1100 is an example of an Apple Lightning connector compatible contactless device. Accessory device 1100 is referred to as a "contactless device" because it is capable of communicating without making contact using radio frequency.

FIG. 12 shows a Lightning connector accessory device 1200 that provides a subset of the functionality of accessory device 1100 (FIG. 11). Lightning connector accessory device 1200 does not include Lightning and interface circuitry 1120, so the functionality available from the Apple Lightning connector is limited. In some embodiments, microUSB connector 1130 and smartcard/NFC circuitry 1140 are both coupled to the power terminals of Lightning compatible contacts 1110. In this manner, microUSB connector 1130 can still effect charging of the mobile device, and smartcard/NFC circuitry 1140 can still be powered by the mobile device allowing for a very small antenna(s) 1150.

Figure 13:
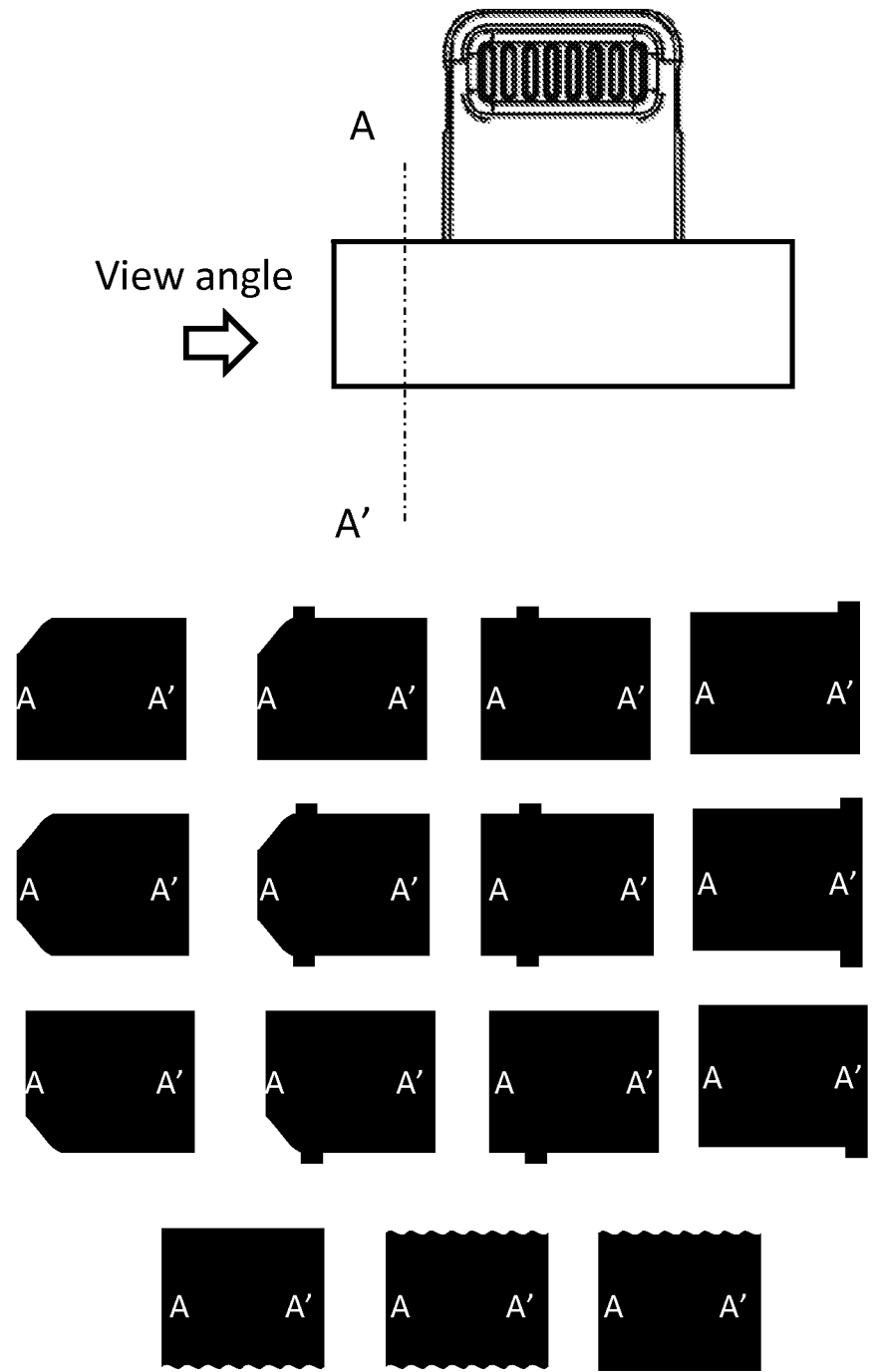
FIG. 13 shows a various accessory device relief patterns in accordance with various embodiments of the present invention.

FIG. 13 shows a various accessory device relief patterns in accordance with various embodiments of the present invention. As shown in FIG. 13, the housing may include any shape or relief to aid in retention or retrieval. Various reliefs include bumps, ridges, recesses, ripples, and others. The various relief patterns may exist on one or more sides of the housing.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An apparatus comprising:
   a printed circuit board having microUSB contacts on a first end and Apple Lightning compatible contacts on a second end;
   an integrated circuit die electrically and mechanically coupled to the printed circuit board;
   a housing situated about the first end of the printed circuit board; and
   an embedded antenna electrically coupled to the integrated circuit die.

2. The apparatus of claim 1 wherein the embedded antenna is formed with traces on the printed circuit board.

3. The apparatus of claim 1 wherein the embedded antenna is suspended within the housing.

4. The apparatus of claim 1 wherein the integrated circuit die comprises smartcard circuitry.

5. The apparatus of claim 4 wherein the smartcard circuitry includes circuitry to transmit information using radio frequency.

6. The apparatus of claim 5 wherein the smartcard circuitry receives power from the Apple Lightning compatible contacts.

7. The apparatus of claim 1 wherein the embedded antenna is oriented parallel to the printed circuit board.

8. The apparatus of claim 1 wherein the embedded antenna is oriented perpendicular to the printed circuit board.

9. The apparatus of claim 1 wherein the printed circuit board has a first portion that is completely enveloped by a mobile device when inserted into a Lightning connector, and the integrated circuit die is mechanically coupled to the first portion of the printed circuit board.

10. The apparatus of claim 1 wherein the integrated circuit die is coupled only to Apple Lightning compatible contacts that provide power.

11. The apparatus of claim 1 wherein the integrated circuit die is coupled to Apple Lightning compatible contacts that provide power and data.

* * * * *